Patented Jan. 13, 1953

2,625,514

UNITED STATES PATENT OFFICE 2,625,514

NONCAKING ABRASIVE DETERGENT COMPOSITIONS

Hans George Kirschenbauer, Allendale, N. J., assignor to Colgate-Palmolive-Peet Company, Jersey City, N. J., a corporation of Delaware No Drawing. Application December 24, 1949, Serial No. 135,039

19 Claims. (Cl. 252—131)

The present invention relates to new essentially abrasive detergent compositions in particulate form, more particularly to powdered, granulated, or otherwise comminuted detersive scouring materials and the like having improved properties; and to a process for preparing the same. By the term "essentialy abrasive" it is meant that the detergent composition contains as the major or essential ingredient a water insoluble abrasive siliceous material such as silica.

The tendency of various materials in particulate form to cake under adverse atmospheric conditions is a significant problem. Depending upon the nature of the material and the conditions to which it has been subjected, caking may convert a free flowing powder either to a lightly packed friable state, to a sluggish damp mass, or even to a brittle, rock-like condition. Accordingly, the term "caking" or its equivalent as used herein refers to the change of state from a mass of discrete, more or less free flowing solid particles, to an agglomerated solid mass that is not free flowing, at least in terms of particles of the initial size. The obvious adverse effects on consumer appeal due to caking of a product has lead to much experimentation towards the discovery of agents which tend to minimize the caking tendency of various abrasive comminuted type products. Various additives such as chalk, salt, saw dust, talc, etc., have been suggested as a means of reducing the caking properties of products in particulate form with varying degrees of success.

It has now been found that the dry-mixing of such essentially abrasive detersive compositions in particulate form with a synthetic hydrated magnesium silicate material preferably in powdered form, and having an $MgO:SiO_2$ ratio of a maximum of about 1:2, is effective to improve the properties of such detersive compositions.

The tendency of abrasive detersive compositions to cake under adverse atmospheric conditions is markedly reduced by the incorporation of these synthetic hydrated magnesium silicate compounds which are active to maintain the composition in a substantially non-caking, free-flowing, particulate state. Moreover, the addition of this particular type of magnesium silicate adduct yields a number of other significantly improved properties such as improved perfume retention and stabilization, improved whiteness (provided the detergent composition of course does not possess a pure white color) and enhanced dispersing and deflocculating power of the abrasive detersive composition in the presence of aqueous and organic solvents.

The mechanisms by which these improvements are effected are not completely understood at this time. With regard to the anti-caking effects, it is believed that the function of this additive probably is for adherence to the sticky surfaces of the particles of the product, and thereby prevent the caking of such particles to a significant degree. Accordingly, it is generally considered more desirable to use the additive in powdered form since it can be distributed over a greater surface area of the detergent particles. With regard to whiteness improvement, it appears that the magnesium silicate particles become so completely distributed upon the surfaces of the treated products that the latter will assume the desirable white color of the magnesium silicate compounds. It is considered that such behavior is quite unexpected since if titanium dioxide, for example, is added to the composition in equivalent amounts neither the color nor the anti-caking properties appear to be improved to any significant degree.

As previously indicated, the essential additive is a synthetic hydrated magnesium silicate material having an $MgO:SiO_2$ ratio of at least about 1:2. The amount of chemically combined water may be varied according to the method of manufacture. It is preferred to use a synthetic hydrated magnesium tri-silicate, preferably having a magnesia to silica ratio of about 1:2 to about 1:3 with varying amounts of water of hydration. This material should be used preferably in the powdered state whereby approximately a major amount of the particles may pass through a 100 mesh, and even a 200 mesh screen. A synthetic magnesium silicate material which has given particularly satisfactory results has the approximate formula: $MgO \cdot 2.5SiO_2 \cdot H_2O$ and the following characteristics: a bulk density of about 8 to about 12 pounds per cubic foot, moisture content of about 6 to about 12%, soluble chlorides as calcium chlorides in up to about 3%, and a pH in a 10% water suspension of about 7.5 to about 8.5. This material is most effective when used in a finely powdered form, e. g. about 99% through a 200 and even a 325 mesh screen, though satisfactory results are obtained when employed in a less fine state, e. g. about 80–95% through a 100 mesh and about 60–85% through a 200 mesh screen.

These synthetic hydrated magnesium silicates may be made in any convenient manner. One suitable procedure for the formation of the hydrated magnesium silicate broadly is the reaction of a hot solution of a magnesium salt of a strong acid (e. g. magnesium chloride) upon a calcium silicate for a time sufficient to effect a substantial conversion of the calcium silicate to the magnesium silicate. This procedure is more specifically described in U. S. Patent No. 2,163,525, to Lyle Caldwell.

According to the circumstances of manufacturing, the hydrated magnesium silicate may be chemically and/or physically associated with other materials, such as silicates, chlorides and the like. The presence of minor amounts of relatively inert materials is contemplated within the scope of the invention, provided the same are not significant enough to materially neutralize or adversely affect the desired improvements to be accomplished with the synthetic hydrated magnesium silicate compound.

These additives may be incorporated in the detersive composition in any suitable manner which permits the hydrated magnesium silicate to produce the desired effects. It has been found that this additive should be dry mixed with the other components of the detersive composition in order to obtain the desired results. Thus, the magnesium silicate may be added by tumbling, fluidizing, in conventional soap powder mixers, and by any other suitable means for mechanical incorporation or admixture. It is preferred to add the magnesium silicate in minor amounts effective to produce such desired properties of the detergent composition as improved anti-caking power, perfume retention and stabilization, enhanced deflocculating power in aqueous and organic solvents, etc. This minor amount of additive generally varies within rather definite proportions of the order of from about ½% to about 20% by weight of the finished detergent composition, and preferably up to about 10%.

The essentially abrasive detergent compositions in particulate form comprised by the invention contain as the major or essential ingredient a water insoluble siliceous abrasive material. These abrasive agents suitable for use in scouring powders and the like are well known in the art and include silex, tripoli, pumice, volcanic ash, pumicite, bentonite, diatomaceous earth, feldspar, etc. and mixtures thereof. The abrasives may vary in hardness and particle size, and the choice for a particular composition is generally dependent upon the contemplated field of application. The mesh size of the particles may vary from about 40 to about 400 generally. Thus, while a mesh of about 40-80 may be suitable for manufacturing a scouring powder for tile and ceramic floors, it would not be suitable for fine marble or glassware which would require a scratchless abrasive of about 200 mesh. For general use, it is preferred to use either silica (e. g. silex) or feldspar of various degrees of fineness for they are relatively hard and result in a whiter product. These abrasives should be usually at least 100 mesh and preferably at least 200 mesh for the major part of the composition.

The concentration of abrasive is variable and generally at least about 50%, and preferably at least about 60 to about 95%.

It is common to employ various adjuvant materials in abrasive detersive compositions. These additives may be inorganic or organic in structure and may be included in compositions of the present invention. Inorganic water soluble alkaline builders such as the alkali metal carbonates, bicarbonates, phosphates (e. g. trisodium phosphate, tetrasodium pyrophosphate, sodium tri-polyphosphate), silicates and borates may be added in any suitable amounts, usually up to about 25% and preferably up to about 15%. Similarly, there may be employed minor amounts of wood pulp, saw dust, magnesite, whiting, sodium carboxymethylcellulose, etc.

It is a more specific feature of this invention that an organic detersive agent be present in these compositions. The caking tendencies and the like of these agents may be improved by the presence of the magnesium poly-silicates such that they may exert their beneficial action on detergency and/or foaming in the abrasive compositions to a maximum possible degree. These organic detersive agents may be either anionic, cationic, or non-ionic in character. Where they are liquids under normal conditions, such as the non-ionic agents generally, they may be prepared in particulate solid form after adsorption upon diatomaceous earth or other similar agents in procedures well known in the art.

As examples of suitable anionic detersive compounds contemplated within the ambit of the invention are the soaps and the sulfated and sulfonated syntheteic detergents, especially those anionic detergents having about 8 to about 26 and preferably about 12 to about 22 carbon atoms to the molecule. The soaps are generally the water soluble salts of higher fatty acids and mixtures thereof.

The sulfated and sulfonated detersive compounds are also well known in the art and may be prepared from suitable organic materials which are applicable to sulfonation ("true sulfonation and/or sulfation"). Of the vast variety of sulfates and sulfonates suitable, it is preferred to use the aliphatic sulfates and sulfonates of about 8 to 22 carbon atoms and the alkyl aromatic sulfonates.

The alkyl aromatic sulfonate detergents referred to may be mononuclear or polynuclear in structure. More particularly, the aromatic nucleus may be derived from benzene, toluene, xylene, phenol, cresols, phenol ethers, naphthalene, derivatives of phenanthrene nuclei, etc. It has also been found that the alkyl group may vary similarly. Thus, for example, the alkyl group may be straight or branch chained and may consist of such radicals as dodecyl, hexyl, octyl, nonyl, decyl, keryl, mixed alkyls derived from fatty materials, cracked paraffin wax olefines, and polymers of lower mono olefins, etc. While the number of sulfonic acid groups present on the nucleus may vary, it is usual to have only one such group present in order to preserve as much as possible a balance between hydrophilic and hydrophobic portions of the molecule.

More specific examples of suitable alkyl aromatic sulfonate detergents are the propylated naphthalene sulfonates, the mixed butyl naphthalene sulfonates, tetrahydronaphthalene sulfonates, the various butylated diphenyl sulfonates and phenylphenol sulfonates. It is preferred, however, to use the higher alkyl aromatic sulfonates rather than the lower alkyl substituted detergents. Typical examples of this preferred class are the sulfonated and alkylated benzene type compounds wherein the alkyl group is at least 8 and preferably about 10 to about 16 carbon atoms. The benzene ring may possess other substituents including alkyl and hydroxy groups.

Other suitable agents are the surface-active sulfated or sulfonated aliphatic compounds, preferably having 8–22 carbon atoms. Within the scope of such definition are the sulphuric acid esters of polyhydric alcohols incompletely esterified with higher fatty acids, e. g. coconut oil monoglyceride monosulphate, tallow diglyceride monosulphate; the long chain pure or mixed alkyl sulfates, e. g. lauryl sulfate, cetyl sulfate; the hydroxy sulfonated higher fatty acid esters, e. g. higher fatty acid esters of low molecular weight alkylol sulphonic acids, e. g. oleic acid ester of isethionic acid; the fatty acid ethanolamide sulfates; the fatty acid amides of amino alkyl sulfonic acids, e. g. lauric amide of taurine, and the like. More particularly, it is preferred to use the sulfated aliphatic compounds containing at least about 8 carbon atoms, especially those having 12 to about 22 carbon atoms to the molecule.

As suitable cationic detergents there may be noted the long chain alkyl quaternary ammonium compounds, e. g. cetyl quarternary ammonium salts. Within this group are included those salts wherein the nitrogen atom may be part of an open chain or heterocyclic structure, such as cetyl tri-methyl ammonium chloride and cetyl pyridinium chloride. Another equivalent cationic agent is the diethylene amino ethyl oleyl amide product.

The non-ionic agents are also well known in the art including the polyoxyethylene ethers of alkyl aromatic hydroxy bodies (e. g. the alkylated polyoxyethylene phenols) and the polyoxyethylene ethers of long chain aliphatic alcohols.

The anionic and cationic surface active agents are commonly used in the form of their water soluble salts. For the synthetic anionic compounds, the alkali metal (e. g. sodium, potassium) and ammonium salts are preferred, though other salts such as amine, alkylolamine, alkaline earth metals (e. g. calcium, magnesium) salts may be used if desired. For the cationic agents the chloride, sulfate, acetate, and like salts may be employed satisfactorily.

Any amount of detersive compound may be used provided the essential character of the composition is preserved for practical purposes. Generally, it is preferred that the detergent be present in amounts up to about 15% by weight, and preferably from about 2 to about 10%. Commercial detergent compositions in which these organic detergents are the active ingredients and are compounded with other materials including sodium sulfate, the various phosphates, etc. may be employed with satisfactory results.

The following examples are illustrative of the present invention and it will be understood that the invention is not limited thereto.

*Example I*

Abrasive cleansing compositions are prepared by dry-mixing about 73 parts by weight of fine silex, about 12 parts sodium sulfate, about 10 parts trisodium phosphate, about 5% higher fatty acid monoglyceride sulfated detergent salt. Into separate samples, there is incorporated one of the following: 5% by weight calcium carbonate, 5% wood flour, 5% diatomaceous earth, 5% starch and 5% $MgO \cdot 2.5SiO_2 \cdot H_2O$. These samples in open and closed containers are subjected to adverse atmospheric conditions of the order of 90° F. and 90% relative humidity for a number of hours. The samples containing the magnesium silicate additive exhibit significantly improved anti-caking power, and are much superior to any of the compositions containing other proposed anti-caking agents.

Similar compositions containing 2, 10, 15 and 20% of the magnesium silicate additive are also effective markedly to reduce the caking tendency in the relationship set forth. It is preferred to use not above about 10% and preferably in effective amounts up to about 5% since larger amounts of additive, though highly satisfactory, do not yield proportionately improved results.

*Example II*

An abrasive cleanser is prepared by dry-mixing the following ingredients in powder form:

| | Percent |
|---|---|
| Silex | 62 |
| Synthetic hydrated magnesium tri-silicate | 5 |
| Trisodium phosphate | 15 |
| Commercial sodium salt of sulfuric acid esters of coconut oil monoglycerides (⅓ active ingredient, ⅔ sodium sulfate) | 18 | and a minor amount of perfume. This composition is submitted to additional testing involving prolonged storage, shipping, and conditions encountered in the normal use of the product. This composition exhibits remarkably improved anti-caking, whiteness, and perfume retention properties in comparison to the effects obtained from similar compositions without the desired magnesium poly-silicate additive.

The following formulations are additional examples of scouring powders and the like embodying the present invention and possessing desirable free-flowing, whiteness and perfume retention characteristics:

*Example III*

| | |
|---|---|
| Silex | 74.2 |
| Trisodium phosphate | 9.8 |
| Tetrasodium pyrophosphate | 0.6 |
| Sodium chloride | 0.1 |
| Sodium carbonate | 0.1 |
| Sodium sulfate | 8.6 |
| Synthetic hydrated magnesium tri-silicate | 1.0 |
| Sodium salts of coconut oil monoglyceride monosulfate | 5.6 |

On wet method testing, the amount retained on a No. 100 sieve is about 0.5%, No. 200 sieve about 7.5%, and a No. 325 sieve about 16.5%.

*Example IV*

| | |
|---|---|
| Feldspar | 93.7 |
| Trisodium phosphate | 0.4 |
| Sodium chloride | 0.1 |
| Sodium carbonate | 0.6 |
| Soap | 3.2 |
| Synthetic hydrated magnesium tri-silicate | 2.0 |

The residue on a wet sieve is about .08% for a No. 100, and 5.25% for a No. 200 sieve.

*Example V*

| | Percent |
|---|---|
| Silex | 65.95 |
| Trisodium phosphate | 15.00 |
| Sodium sulfate | 12.00 |
| Sodium salts of sulfuric acid esters of coconut oil monoglycerides | 6.00 |
| Synthetic hydrated magnesium tri-silicate | 1.00 |
| Perfume | 0.05 |

These percentages are on a solids basis. The composition possessed about 7.5% moisture.

*Example VI*

| | |
|---|---|
| Silex | 80.3 |
| Trisodium phosphate | 8.0 |
| Sodium propylene tetramer benzene sulfonate salt (35% active ingredient) | 10.5 |
| Synthetic hydrated magnesium trisilicate | 1.0 |
| Perfume | 0.2 |

The above amounts are on a solids basis. Moisture content about 4.8%.

Example VII

| | |
|---|---|
| Volcanic ash | 76.0 |
| Trisodium phosphate | 10.0 |
| Sodium kerylbenzene sulfonate | 8.0 |
| Synthetic hydrated magnesium tri-silicate | 2.0 |
| Sodium carbonate | 1.5 |
| Sodium salt of carboxymethylcellulose | 2.5 |

Example VIII

| | |
|---|---|
| Silex | 81.0 |
| Trisodium phosphate | 9.0 |
| Synthetic hydrated magnesium tri-silicate | 0.5 |
| Sodium carbonate | 0.5 |
| Sodium coconut oil fatty alcohol sulfates (30% active ingredient) | 9.0 |

Example IX

| | |
|---|---|
| Silex | 90.0 |
| Soap chip dust | 1.0 |
| Sodium carbonate | 2.0 |
| Trisodium phosphate | 5.0 |
| Synthetic hydrated magnesium tri-silicate | 2.0 |

The term "consisting essentially of" as used in the definition of the ingredients present in the composition claimed is intended to exclude the presence of other materials in such amounts as to interfere substantially with the properties and characteristics possessed by the composition set forth but to permit the presence of other materials in such amounts as not substantially to affect said properties and characteristics adversely.

Although the present invention has been described with reference to particular embodiments and examples, it will be apparent to those skilled in the art that variations and modifications of this invention can be made and that equivalents can be substituted therefor without departing from the principles and true spirit of the invention.

Having described the invention what is desired to be secured by Letters Patent is:

1. An essentially abrasive detergent composition in particulate form consisting essentially of a water insoluble siliceous abrasive material, and a minor amount up to about 20% of a powdered synthetic hydrated magnesium silicate admixed therewith and active to maintain said abrasive composition in a substantially non-caking, free-flowing particulate state, said silicate having a ratio of MgO to $SiO_2$ of about 1:2 to about 1:3.

2. An essentially abrasive detergent composition in particulate form consisting essentially of a water insoluble siliceous abrasive material, and a minor proportion up to about 20% of a powdered synthetic hydrated magnesium tri-silicate which is effective to improve the anti-caking properties of said detergent composition.

3. An essentially abrasive detergent composition in particulate form consisting essentially of a water insoluble siliceous abrasive material, and a minor proportion of a powdered synthetic hydrated magnesium tri-silicate having the approximate formula: $MgO \cdot 2.5SiO_2 \cdot H_2O$ and up to about 20% by weight and active to maintain said detergent composition in a substantially non-caking, free-flowing state.

4. A substantially non-caking, free-flowing abrasive particulate composition consisting essentially of a water insoluble siliceous abrasive material from the group consisting of silex, tripoli, feldspar, pumice, volcanic ash, pumicite and mixtures thereof, and a minor proportion up to about 20% of a powdered synthetic hydrated magnesium silicate compound having a magnesium oxide to silica ratio of about 1:2 to about 1:3 and active to maintain said composition in a substantially non-caking, free-flowing particulate state.

5. An essentially abrasive detergent composition in particulate form consisting essentially of a water insoluble siliceous abrasive material, a minor proportion from about 0.5% to about 20% of a synthetic hydrated magnesium silicate material having an MgO to $SiO_2$ ratio of about 1:2 to about 1:3, and a minor amount up to about 15% by weight of anionic detergent admixed therewith.

6. An abrasive detergent composition in particulate form consisting essentially of a water insoluble siliceous abrasive material in at least about 50% by weight, a minor proportion from about 0.5% to about 20% of a powdered synthetic hydrated magnesium silicate material having an MgO to $SiO_2$ ratio of about 1:2 to about 1:3 and active to minimize the caking tendency of said composition under adverse conditions, and a minor proportion up to about 15% of organic detergent material admixed therewith.

7. A substantially non-caking, free-flowing abrasive particulate composition consisting essentially of a water insoluble siliceous abrasive material from the group consisting of silex, tripoli, feldspar, pumice, volcanic ash, pumicite and mixtures thereof, and a minor proportion up to about 20% of a powdered synthetic hydrated magnesium silicate compound having a magnesium oxide to silica ratio of about 1 to about 2.5 and active to maintain said composition in a substantially non-caking, free-flowing particulate state.

8. An abrasive detergent composition in particulate form consisting essentially of silica, and a minor proportion up to about 20% of a synthetic hydrated magnesium silicate material having an $MgO:SiO_2$ ratio from about 1:2 to about 1:3 in relatively fine particulate form admixed therewith and effective to improve the properties of said abrasive composition while in a particulate state.

9. An abrasive detergent composition in particulate form consisting essentially of feldspar, and a minor proportion up to about 20% of powdered synthetic hydrated magnesium silicate compound having the ratio of $MgO:SiO_2$ from about 1:2 to about 1:3 admixed therewith and effective to improve the properties of said abrasive composition while in a particulate state.

10. An abrasive detergent composition in particulate form consisting essentially of a water insoluble siliceous abrasive material in at least about 50% by weight, a minor proportion up to about 20% of a powdered synthetic hydrated magnesium silicate material having an MgO to $SiO_2$ ratio from about 1:2 to about 1:3 active to minimize the caking tendency of said composition under adverse conditions, and a minor proportion up to about 15% by weight of an organic detersive compound suitably admixed therewith.

11. An essentially abrasive detergent composition in particulate form consisting essentially of a water insoluble siliceous abrasive material, from about 0.5% to about 10% of a synthetic hydrated magnesium silicate material having an MgO to $SiO_2$ ratio of about 1 to about 2.5 and a minor proportion of up to about 15% by weight anionic detersive compound admixed therewith.

12. A substantially non-caking, free-flowing abrasive particulate composition consisting essentially of a member of the group consisting of silex, tripoli, feldspar, pumice, pumicite, volcanic ash, and mixtures thereof in at least about 50% by weight, up to about 15% by weight of an anionic detersive compound and from about 0.5% to about 20% by weight of a synthetic hydrated magnesium tri-silicate material effective to maintain said composition in a substantially non-caking, free-flowing particulate state.

13. An essentially abrasive detersive composition in particulate form consisting essentially of a water insoluble siliceous abrasive material, a minor amount up to about 15% by weight of soap and up to about 20% by weight of a synthetic hydrated magnesium tri-silicate material active to minimize the caking tendency of said composition under adverse conditions.

14. An essentially abrasive detersive composition in particulate form consisting essentially of a water insoluble siliceous abrasive material, a minor amount up to about 15% by weight of an alkyl aryl sulfonate detersive compound and up to about 20% by weight of a synthetic hydrated magnesium tri-silicate material active to minimize the caking tendency of said composition under adverse conditions.

15. An essentially abrasive detersive composition in particulate form consisting essentially of a water insoluble siliceous abrasive material, a minor amount up to about 15% by weight of a sulfated aliphatic detersive compound and up to about 20% by weight of a synthetic hydrated magnesium tri-silicate material active to minimize the caking tendency of said composition under adverse conditions.

16. A substantially non-caking, free-flowing abrasive detergent composition consisting essentially of a water insoluble siliceous abrasive material, a minor proportion up to about 15% by weight of a water soluble higher alkyl sulfate detersive salt and up to about 20% by weight of a synthetic hydrated magnesium tri-silicate material admixed therewith and effective to improve the properties of said composition while in a particulate state.

17. An abrasive detergent composition in particulate form consisting essentially of a water insoluble siliceous abrasive material, a minor amount up to about 15% by weight of the water soluble salts of sulfuric acid esters of polyhydric alcohols incompletely esterified with at least a higher fatty acid, and a minor amount up to about 20% by weight of a powdered synthetic hydrated magnesium silicate having a magnesium oxide to silica ratio of about 1:2 to about 1:3 effective to improve the properties of said composition while in a particulate state.

18. A substantially non-caking, free-flowing particulate abrasive composition consisting essentially of a water insoluble siliceous abrasive material in at least about 50% by weight, a minor proportion up to about 15% by weight of a water soluble higher fatty acid monoglyceride monosulfate salt, and a minor amount up to about 20% by weight of a synthetic hydrated magnesium tri-silicate compound having the approximate formula: $MgO \cdot 2.5SiO_2$ admixed therewith.

19. A substantially non-caking, free-flowing particulate abrasive composition consisting essentially of a water insoluble siliceous abrasive material in at least about 50% by weight, a minor proportion up to about 15% by weight of higher alkyl mononuclear aryl sulfonate detergent material, and a minor amount from about 0.5% to about 20% by weight of a synthetic hydrated magnesium silicate compound having the approximate formula: $MgO \cdot 2.5SiO_2$ admixed therewith.

HANS GEORGE KIRSCHENBAUER.

REFERENCES CITED

The following references are of record in the file of this patent:

UNITED STATES PATENTS

| Number | Name | Date |
|---|---|---|
| 1,943,584 | Cross | Jan. 16, 1934 |
| 1,945,534 | Rembert | Feb. 6, 1934 |
| 1,968,628 | Alton | July 31, 1934 |
| 2,258,587 | Goodner | Oct. 14, 1941 |
| 2,296,689 | Soderberg | Sept. 22, 1942 |
| 2,399,655 | Alton | May 7, 1946 |

FOREIGN PATENTS

| Number | Country | Date |
|---|---|---|
| 348,184 | Great Britain | May 8, 1931 |